United States Patent [19]

Hsu

[11] 4,448,027

[45] May 15, 1984

[54] CARTRIDGE CONTAINING WATER EXPANDABLE MEMBERS

[76] Inventor: Charles J. Hsu, P.O. Box 460, Grand Central Station, New York, N.Y. 10017

[21] Appl. No.: 296,558

[22] Filed: Aug. 26, 1981

[51] Int. Cl.³ .............................................. F01B 29/00
[52] U.S. Cl. .................................... 60/721; 137/78.1; 222/54
[58] Field of Search ...................... 92/89, 90; 137/78.1, 137/78.5; 60/527, 530, 531, 721; 252/194; 222/54; 73/209 R; 374/204

[56] References Cited

U.S. PATENT DOCUMENTS 3,280,549 10/1966 Hsu ........................................ 60/721

FOREIGN PATENT DOCUMENTS 3026864 2/1982 Fed. Rep. of Germany ........ 60/527
139556 10/1981 Japan ................................... 252/194

*Primary Examiner*—Allen M. Ostrager
*Assistant Examiner*—Stephen F. Husar
*Attorney, Agent, or Firm*—Toren, McGeady and Stanger

[57] ABSTRACT

A cartridge is made up of a plurality of packet-like members each forming a closed pocket containing a material which expands to many times its dry volume when contacted by liquid water. The packet-like members are arranged superposed on one another with the members secured together as a unit. When the material is contacted by water, the individual packet-like members expand but the members remain together as a unit.

9 Claims, 10 Drawing Figures

CARTRIDGE CONTAINING WATER EXPANDABLE MEMBERS

SUMMARY OF THE INVENTION

The present invention is directed to a cartridge including a plurality of packet-like members containing a material which expands when contacted by water and, more particularly, it is directed to a cartridge where the packet-like members are connected together as a unit and remain in this form even when the material in the members expands.

The use of a water immerged expandable cartridge is known, such as disclosed in the applicant's U.S. Pat. Nos. 3,280,549 and 3,745,659. It is known to provide individual expandable cartridges or to interconnect a number of such cartridges. One of the problems experienced in the past has been to assure the combined effect of a number of the cartridges when used for operating a valve or opening a container holding a dye for use as a marker. Further, there has been the problem of providing a layer of the expandable material within a packet-like member so that the maximum effectiveness is achieved.

Therefore, it is the primary object of the present invention to provide a cartridge arrangement of packet-like members containing material which expands when exposed to water so that the problems experienced in the past are avoided.

Another object of the invention is to afford a selected amount of the expandable material within the packet-like member so that the maximum expanding effect is achieved in the minimum time.

In accordance with the present invention, the cartridge is made up of a plurality of packet-like members. Each packet-like member includes a water permeable flexible cover arranged to form a closed pocket within which a quantity of dry expandable material is filled. Preferably, a thin layer of the material is provided in each pocket. To assure the maximum effect of the expansion of the packet-like members, they are arranged superposed one on the other and, if necessary, can be connected together at a number of points around their peripheral edges so that even when the material expands the members remain connected together so that a maximum force is provided for operating a valve, for opening a container or for some similar purpose. If the packet-like members are closely confined within a casing, it is unnecessary to interconnect their peripheral edges. Moreover, a cartridge may be used where its expandable feature is required, but its peripheral edges are not interconnected and it is not enclosed within a casing.

Preferably, the substance used as the expandable material only reacts to the presence of water and not to other liquids which do not contain water. Either natural or synthetic substances can be used as the expandable material. The material is utilized in a form which assures maximum expansion in the least period of time. Accordingly, material in a form providing a maximum contact surface for the water usually affords the best effect.

It would be expected that to provide the maximum force a single water permeable container filled with the expandable material would be preferred. When water contacts the material, however, the expansion effect in the outer layer of the material tends to prevent or limit inward flow so that while the material contacting the inside surface of the container expands the other material located inwardly of it does not expand or expands at a much slower rate. Therefore, it is important to provide the material in a packet-like member so that all of the material is contacted by the water as it flows through the water permeable cover of the packet-like member to assure the rapid expansion of all of the material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
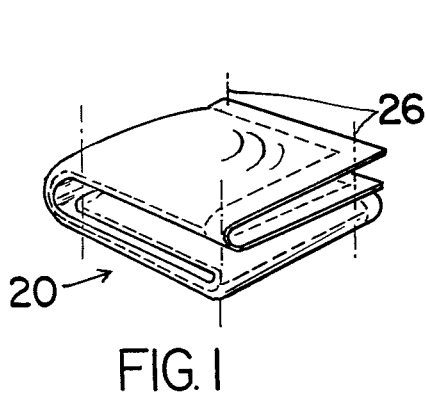
FIG. 1 is a perspective view of one embodiment of the present invention.

In FIG. 1 a cartridge 20 is shown made up of a number of packet-like members 20a. In this embodiment the packet-like members are interconnected. A packet-like member as referred to in this specification is a thin flat member, it may have a rectangular, polygonal, circular or other arcuate edge configuration somewhat in the form of a thin, generally flat tea bag.

Figure 3:
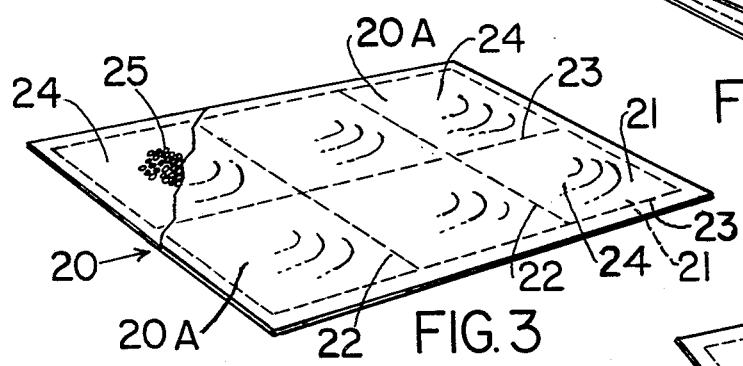
FIG. 3 is a perspective view showing the cartridge of FIG. 1 in the open condition.

As indicated in FIG. 3, the individual packet-like members 20a are formed by a pair of sheets 21 of a flexible water permeable porous material, such as a woven cotton fabric. Other fabrics can be used as well as porous synthetic materials, paper or metal foils perforated to permit the passage of water. The significant feature of the cover is that it permits an almost instantaneous flow of water into the interior of the packet-like member.

In FIG. 3, one sheet 21 is superposed on the other and then the sheets are stitched together along parallel rows 22, 23 with the rows 22 disposed substantially perpendicular to the rows 23 and spaced apart so that the stitched rows divide the cover or sheets into a plurality of pockets 24. It is important that the material forming the sheets 21 is flexible so that the sheets can be displaced apart from one another.

Each of the pockets is filled with a thin layer of a water expandable material 25. The material 25 can be a natural or a synthetic material. One natural material is sterculia lychnophora Hance derived from a plant which grows in the Orient. When this plant is dried and pulverized and then contacted by liquid water it expands to over 15 times its original size. This material expands when it is contacted by liquid water but not when it is contacted by other liquids such as oils not containing water. Further, the term liquid water is used, because the material does not expand to any significant extent in the presence of humid air or water vapor.

There are synthetic materials presently available which have the same general characteristics of the sterculia lychnophora Hance powder. These materials are super-absorbent and can be used in powdered or chopped form or in the form of paper or cardboard forms.

Figure 2:
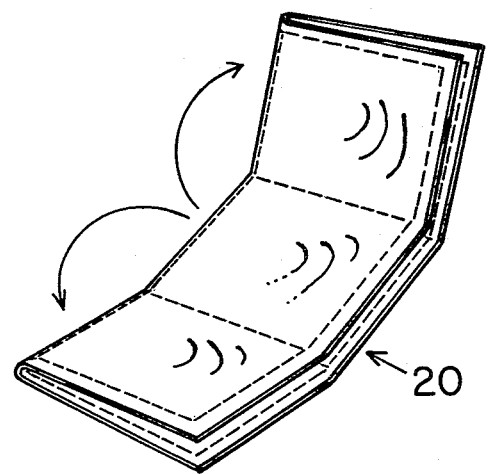
FIG. 2 is a perspective view showing the cartridge of FIG. 1 partly unfolded.

After the two sheets 21 have been stitched together with the material 25 within the pockets 24, the stitched sheets are folded over along one of the rows of stitches 23 into the form shown in FIG. 2. Next the two outer packet-like members 20a are folded first one and then the other over the center pair of members so that the folded construction is as shown in FIG. 1.

Figure 10:
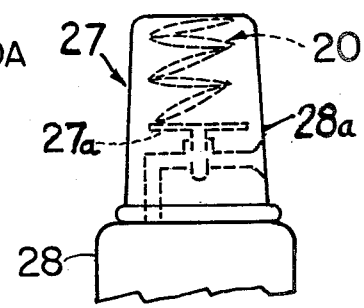
FIG. 10 is a perspective view showing one way in which the cartridge of the present invention can be used for operating another apparatus.

After having been folded, the corners of the cartridge 20 are secured together by a thread or wire 26 so that the cartridge remains in the illustrated form even after it is immersed in water which would cause the individual packet-like members 20a to expand. Since the threads or wires 26 hold the cartridge in the illustrated form, there is a cumulative effect of the expansion of the material 25 in each of the pockets 24 so that a significant force is developed for triggering a valve or some other mechanism whereby the force assures that the valve is opened. For example, if the cartridge is used to actuate an aerosol container 27 such as shown in FIG. 10, the individual packet-like members do not become displaced, rather they remain in the original position within the cartridge and the cartridge expands assuring that the required operating force is developed.

The individual layer of material 25 within the pocket 24 is relatively thin, usually not exceeding about one-eighth of an inch. As mentioned above, it has been found if a thick layer of the material is used, the expanding effect of the material within the interior of the layer is lost because the water does not reach the interior or does so at a much reduced rate. Accordingly, a critical feature of the invention is that the material 25 is provided in a thin layer within each of the pockets. Typically, a packet-like member would have a thickness in the dry state of the expandable material of about one eighth of an inch.

Figure 4:
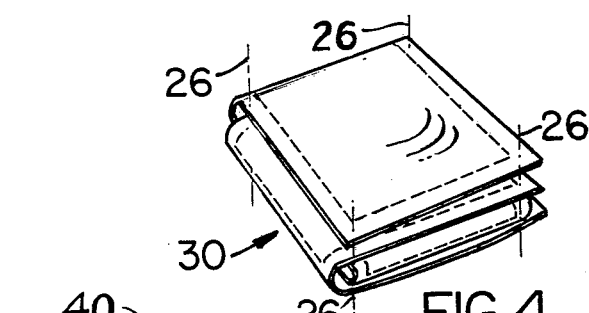
FIG. 4 is a perspective view of another embodiment of the present invention.
Figure 5:
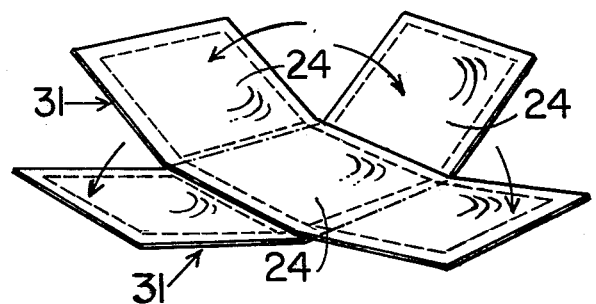
FIG. 5 is a perspective view showing the cartridge of FIG. 4 in the partly unfolded state.

In FIG. 4, another cartridge 30 is shown in a manner similar to the cartridge illustrated in FIGS. 1–3, however, in this embodiment, in the flat or unfolded state, the cartridge is cruciform. This arrangement can be provided by two pair of crossing strips 31 or, alternatively, by two cruciform shaped sheets, one superimposed on the other. The strips are stitched along the edges and along two spaced lines extending transversely of the long dimension so that three pockets are provided in each pair of strips 31. The strips are formed of a porous flexible material such as in the embodiment of FIGS. 1–3. After the strips 31 have been stitched together with the expandable material 25 filled into each of the pockets 24 the individual packet-like members can be folded over upon the central member or members to provide the folded or assembled cartridge 30. In FIG. 5 the arrows indicate the manner in which the members are unfolded. In the folded condition, the four corners of the cartridge are connected by a thread, wire or similar member 26 so that the folded arrangement is maintained even when the cartridge is exposed to or immersed in liquid water. By securing the corners of the packet-like members together the force generated when the individual members expand is cumulative so that the use of the expanded cartridge as an actuating member is made more effective.

Figure 6:
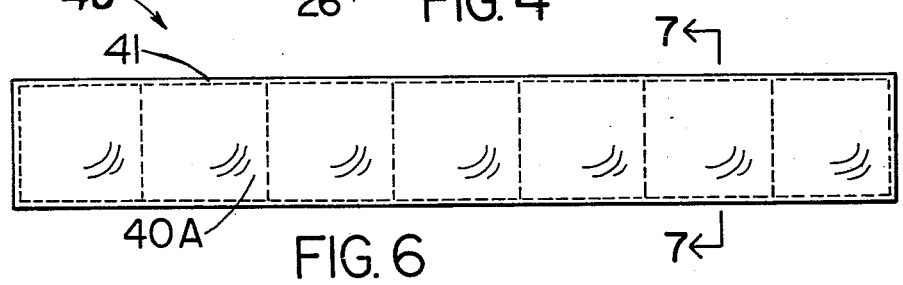
FIG. 6 is a plan view of another embodiment of the present invention.

In FIG. 6 another cartridge 40 is shown in the unfolded state. The cartridge 40 is formed by a pair of strips 41 similar to the strips 31 shown in FIG. 5. The individual pockets 44 within each packet-like member 40a are formed by stitching the peripheral edges of the strips together and then providing spaced rows of stitching parallel to the shorter end rows so that the strip is divided into a number of packet-like members 40a of similar size.

Figure 7:
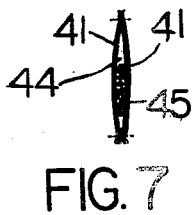
FIG. 7 is a sectional view taken along the line 7—7 in FIG. 6.

As can be seen in FIG. 7 there is a thin layer of the material 45 between the two strips or sheets forming the cover of the packet-like members 40a. When the material is placed within the pocket 44 it would be possible to deposit it all in one corner or in the center of the pocket so that it would have an increased depth, however, when the material is spread out over the full area of the pocket it forms a thin layer. In FIG. 7 the spacing between the two sheets is somewhat enlarged for purposes of illustrating the material. In actual appearance, the opposite side walls of the pocket, that is, the opposite sides formed by the strips 41, are quite close together.

Figure 8:
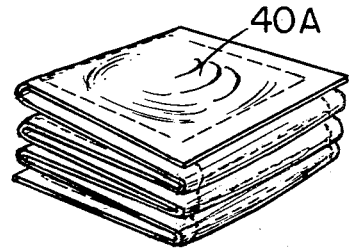
FIG. 8 is a perspective view of the embodiment of FIG. 6 in the assembled unitary state.

When the cartridge 40 is folded the folding operation takes place alternately in opposite directions relative to the shorter stitching rows separating the packet-like members 40a, note FIG. 8. This arrangement provides a more compact construction of the cartridge. While the corners of the individual members 40a could be interconnected, in FIG. 8 they are free to move apart from one another. In FIG. 10 the cartridge 40 is located in an aerosol container 27 within a hollow cap portion 28a containing a valve 27a. In the unexpanded condition the cartridge 40 is held within the hollow cap portion or casing 28a resting against the valve 27a which is closed. If water enters the casing 28a and flows into the individual packet-like members 40a, the material 25 expands. The expansion is limited by the casing closely fitting around the members 40a. As a result, the expanded members press against the valve 27a causing it to open and dispense the contents of the can portion 28 of the aerosol container 27. The aerosol container 27 can hold a dye marking substance or some other material.

While the cartridges have been illustrated and described with the individual packet-like members secured together by threads or wires 26, it can be appreciated that other holding means could be used. For instance, a narrow tape could be used secured to the corners of each of the packet-like members to hold them together in the assembled unitary form. The thread or the tape could be provided with a certain elasticity so that it would expand in the elongated direction when the material within the individual packet-like members expands. Other connecting means could be used for holding the corners of the packet-like members in the different cartridges, or as mentioned above an enclosing casing can provide the same effect.

Figure 9:
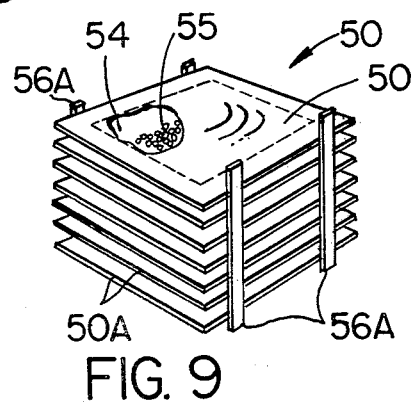
FIG. 9 is a perspective view of another embodiment of the present invention.

In FIG. 9 another cartridge 50 is shown made up of a number of separate packet-like members 50A. The packet-like members 50A can be square, rectangular, circular or some other polygonal or arcuate shape when viewed in plan. The cover of the packet-like members 50a can be formed of a single piece of material folded over upon itself or of two pieces of material joined together to form the pocket 54 filled with an amount of the material 55 so that the packet-like member has a generally flat shape. The edges of the packet-like members 50A can be stitched, glued, or secured together by some other attachment means. In the assembled condition shown in FIG. 9 the packet-like members are placed one on top of the other so that the side walls of adjacent packet-like members are in contact. In FIG. 9, the packet-like members 50A are held together by a strip of tape 56A. The tape can be secured to the edge of each of the members by stitching, gluing or some other attachment means.

When the cartridge 50 is immersed in water or when water flows through the walls of the individual members 50a and contacts the material 55, the material expands so that its volume is many times greater than the original dry volume. For instance, when sterculia lychnophora Hance is contacted by water it expands to more than 15 times its original dry size. A similar effect is achievable when synthetic super-absorbent materials, such as TMPP cellulose polymer, are used. As a result, because the material forming the covers of the packet-like members is flexible the central height of the cartridge increases while the edges remain interconnected. As a result, a considerable force is generated due to the expansion action along the center axis of the cartridge and when this force is applied, such as in the aerosol container 27 illustrated in FIG. 10, it is assured that the force is sufficient to operate the valve and the contents of the container are dispensed.

An important feature of the packet-like member is that the material used to form the cover of such members is flexible yet tear-resistant when wet. If the material tends to tear open or disintegrate in the presence of water, the expanding effect of the cartridge would be lost. The use of woven fabrics for this purpose is particularly beneficial, since such materials are flexible and are generally resistant to tearing even when wet.

While specific embodiments of the invention have been shown and described in detail to illustrate the application of the inventive principles, it will be understood that the invention may be embodied otherwise without departing from such principles.

I claim:

1. A cartridge arranged to expand in the presence of liquid water comprising a plurality of packet-like members, each said packet-like member comprising a water permeable flexible cover arranged to form a closed pocket, a quantity of a dry material located in said pocket with the material being such that it expands to a multiple number of volumes greater than the original dry volume when the material is contacted by liquid water, the amount of material placed in said pocket is limited so that it is sufficient to form a thin layer within said pocket when the material is in the dry state, the cover of said packet-like member comprising a pair of correspondingly shaped oppositely disposed polygonally sided generally planar sides with said material forming a layer between said sides, said packet-like members arranged one superposed on another with adjacent said planar sides of said packet-like members disposed in generally contacting relation and said sides having the corners thereof in alignment, and means for interconnecting said packet-like members around the edges of said sides at least at two oppositely located said sides so that they are secured together as a unit whereby when water passes through said cover and contacts said material, said material expands and greatly increases the volume thereof and the volume of said unit of said packet-like members while said interconnecting means retains said packet-like members in the unit form, said interconnecting means comprising a tape-like strip extending between the peripheral edges of said packet-like members of said cartridge with said tape being fixed to the edges of said packet-like members.

2. A cartridge arranged to expand in the presence of liquid water comprising a plurality of packet-like members, each said packet-like member comprising a water permeable flexible cover arranged to form a closed pocket, a quantity of a dry material located in said pocket with the material being such that it expands to a multiple number of volumes greater than the original dry volume when the material is contacted by liquid water, the amount of material placed in said pocket is limited so that it is sufficient to form a thin layer within said pocket when the material is in the dry state, the cover of said packet-like member comprising a pair of oppositely disposed generally planar sides with said material forming a layer between said sides, said packet-like members arranged one superposed on another with adjacent said planar sides of said packet-like members disposed in generally contacting relation, and means for interconnecting said packet-like members around the edges of said sides so that they are secured together as a unit whereby when water passes through said cover and contacts said material, said material expands and greatly increases the volume thereof and the volume of said unit of said packet-like members while said interconnecting means retains said packet-like members in the unit form, said interconnecting means comprises an elongated member elastic in the elongated direction for securing the peripheral edges of said packet-like members together so that when the material within said members expands said interconnecting means expands while maintaining said members in a unitary form.

3. A cartridge, as set forth in claim 2, wherein the peripheral edges of said cover surrounding the pocket in said packet-like members are stitched together.

4. A cartridge, as set forth in claim 2, wherein the peripheral edges of said cover of said packet-like members encircling said pocket therein are glued together.

5. A cartridge, as set forth in claim 1 or 2, wherein said water expandable material comprises sterculia lynchophora Hance powder.

6. A cartridge, as set forth in claim 1 or 2, wherein said water expandable material comprises a synthetic material.

7. A cartridge, as set forth in claim 1 or 2, wherein said cover comprises a single sheet of material folded over upon itself.

8. A cartridge, as set forth in claim 1 or 2, wherein said cover comprises a pair of sheets forming the opposite side of said packet-like member.

9. A cartridge, as set forth in claim 1 or 2, wherein in the dry state the layer of said water expandable material within the pocket in said packet-like member having a thickness in the direction extending between the sides of said cover not exceeding approximately one-eighth of an inch.

* * * * *